(12) United States Patent
Albu et al.

(10) Patent No.: US 8,649,628 B2
(45) Date of Patent: Feb. 11, 2014

(54) ADAPTIVE PSF ESTIMATION TECHNIQUE USING A SHARP PREVIEW AND A BLURRED IMAGE

(71) Applicant: DigitalOptics Corporation Europe Limited, Galway (IE)

(72) Inventors: Felix Albu, Bucharest (RO); Alexandru Drimbarean, Galway (IE); Adrian Zamfir, Bucharest (RO); Corneliu Florea, Bucharest (RO); Peter Corcoran, Claregalway (IE)

(73) Assignee: DigitalOptics Corporation Europe Limited, Ballybrit, Galway (IE)

( * ) Notice: Subject to any disclaimer, the term of this patent is extended or adjusted under 35 U.S.C. 154(b) by 0 days.

(21) Appl. No.: 13/735,959

(22) Filed: Jan. 7, 2013

(65) Prior Publication Data

US 2013/0278784 A1 Oct. 24, 2013

Related U.S. Application Data

(63) Continuation of application No. 12/820,002, filed on Jun. 21, 2010, now Pat. No. 8,351,726.

(60) Provisional application No. 61/221,467, filed on Jun. 29, 2009.

(51) Int. Cl.
*G06K 9/40* (2006.01)
*G06K 9/42* (2006.01)
*G06K 9/44* (2006.01)
*H04N 5/228* (2006.01)

(52) U.S. Cl.
USPC ...... 382/260; 382/255; 382/275; 348/208.99; 348/208.1; 348/208.6; 348/208.12

(58) Field of Classification Search
USPC .......... 382/255, 260, 275; 348/208.99, 208.1, 348/208.4, 208.6, 208.12
See application file for complete search history.

(56) References Cited

U.S. PATENT DOCUMENTS

| | | | | |
|---|---|---|---|---|
| 7,636,486 | B2 * | 12/2009 | Steinberg et al. | 382/255 |
| 7,639,888 | B2 * | 12/2009 | Steinberg et al. | 382/255 |
| 7,639,889 | B2 * | 12/2009 | Steinberg et al. | 382/255 |
| 7,660,478 | B2 * | 2/2010 | Steinberg et al. | 382/255 |
| 7,676,108 | B2 * | 3/2010 | Steinberg et al. | 382/255 |
| 7,697,778 | B2 * | 4/2010 | Steinberg et al. | 382/255 |
| 2006/0187308 | A1 * | 8/2006 | Lim et al. | 348/208.4 |
| 2006/0279639 | A1 * | 12/2006 | Silverstein et al. | 348/208.14 |
| 2007/0009169 | A1 * | 1/2007 | Bhattacharjya | 382/255 |

(Continued)

OTHER PUBLICATIONS

Wu et al., "Blind Image Blur Identification in Cepstrum Domain", IEEE Proceedings of 16th International Conference on Computer Communications and Networks, 2007, pp. 1166-1171.*

*Primary Examiner* — Matthew Bella
*Assistant Examiner* — Jose M Torres
(74) *Attorney, Agent, or Firm* — Hickman Palermo Truong Becker Bingham Wong LLP

(57) ABSTRACT

An adaptive motion estimation and deblurring technique for acquired digital images includes acquiring multiple digital images with a moving digital image acquisition device that includes an image sensor, including a relatively sharp, underexposed reference image and a blurred image. Anb initial approximate point spread function (PSF) is estimated corresponding to the moving of the device. A different DC offset point is determined and a second PSF is calculated based on the different DC offset point.

18 Claims, 13 Drawing Sheets
(9 of 13 Drawing Sheet(s) Filed in Color)

(56) References Cited

U.S. PATENT DOCUMENTS

| | | |
|---|---|---|
| 2007/0058073 A1* | 3/2007 | Steinberg et al. .............. 348/362 |
| 2007/0171987 A1* | 7/2007 | Trimeche ................. 375/240.27 |
| 2007/0216777 A1* | 9/2007 | Quan et al. ................. 348/222.1 |
| 2007/0296833 A1* | 12/2007 | Corcoran et al. ........ 348/231.99 |
| 2008/0219581 A1* | 9/2008 | Albu et al. .................... 382/261 |
| 2008/0240607 A1* | 10/2008 | Sun et al. ...................... 382/275 |
| 2009/0167893 A1* | 7/2009 | Susanu et al. .............. 348/224.1 |
| 2010/0053349 A1* | 3/2010 | Watanabe et al. .......... 348/222.1 |
| 2010/0201826 A1* | 8/2010 | Steinberg et al. .......... 348/208.4 |
| 2010/0201827 A1* | 8/2010 | Steinberg et al. .......... 348/208.6 |
| 2011/0043548 A1* | 2/2011 | Knapp et al. .................. 345/690 |
| 2011/0050919 A1* | 3/2011 | Albu et al. ................. 348/208.6 |
| 2011/0090352 A1* | 4/2011 | Wang et al. ................. 348/208.6 |
| 2011/0102642 A1* | 5/2011 | Wang et al. .................. 348/241 |

* cited by examiner

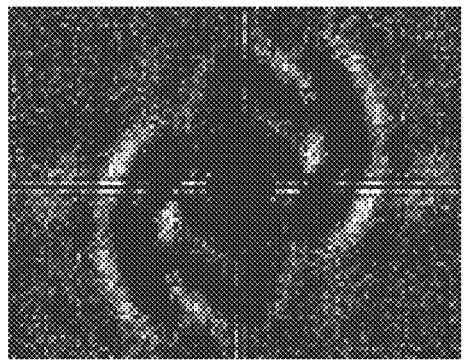
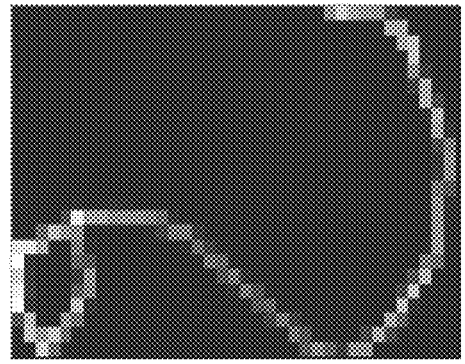
Figure 3a                Figure 3b
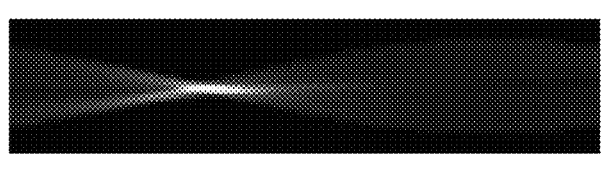
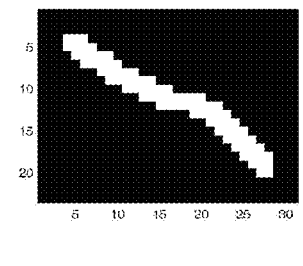
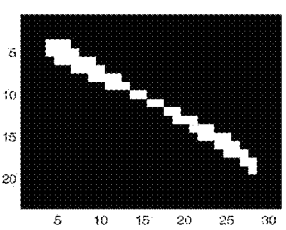
Figure 4a                Figure 4b
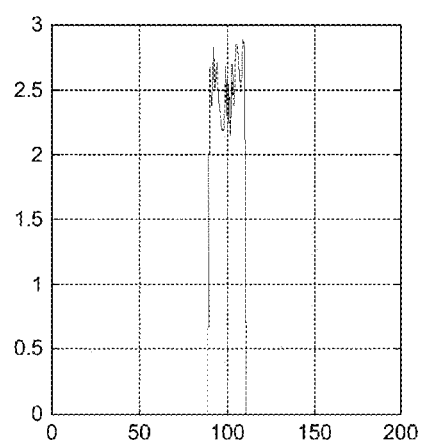
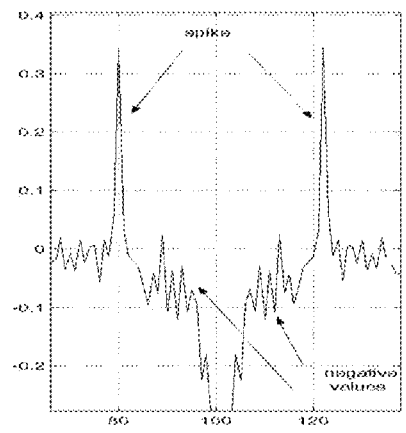
Figure 5a                Figure 5b blurred image preview image computed PSF (19 x 17)

deblurred image using 10 L-R iterations

ADAPTIVE PSF ESTIMATION TECHNIQUE USING A SHARP PREVIEW AND A BLURRED IMAGE

PRIORITY and RELATED APPLICATIONS

This application is a Continuation of U.S. patent application Ser. No. 12/820,002, filed Jun. 21, 2010, now U.S. Pat. No. 8,351,726; which claims priority to U.S. provisional patent application Ser. No. 61/221,467, filed Jun. 29, 2009, which is incorporated by reference. This application relates to two contemporaneously-filed applications of the same title and by the same inventors and assignee, and having U.S. Pat. No. 8,204,330 and U.S. Pat. No. 8,208,746.

BACKGROUND

United States published patent application 2006/0187308 describes a method for deblurring an image. The method involves capturing first and second images, wherein the second image is more blurred and more exposed than the first image. The second image is deblurred based on information determined from the first image.

United States published patent application 2006/0279639 describes a method and system for deblurring an image based on motion tracking. The method and system involve Recorded an image. Motion is detected by a motion sensor of the imaging device during the recording of the light at the image sensor. A blur kernel is generated based on the motion.

United States published patent application 2007/0171987 describes a method for optical flow field estimation using adaptive filtering. The method involves motion estimation processing in video coding and takes into account estimates in an immediate spatio-temporal neighborhood, through an adaptive filtering mechanism, in order to produce a smooth and coherent optical flow field at each pixel position. The adaptive filtering mechanism includes a recursive LMS filter based on a pixel-wise algorithm for obtaining motion vectors in a reference image of a video image frame, while consecutively scanning through individual pixels of the image frame. This motion estimation process is particularly well suited for the estimation of small displacements within consecutive video frames, and can be applied in several applications such as super-resolution, stabilization, and de-noising of video sequences. The method is described as being well suited for high frame rate video capture.

United States published patent application 2007/0009169 describes systems and methods for deblurring a captured image using parametric deconvolution, instead of a blind, non-parametric deconvolution, by incorporating physical constraints derived from sensor inputs, such as a motion sensor, into the deconvolution process to constrain modifications to the point spread function. In an embodiment, a captured image is described as being deblurred using a point spread function obtained from the cross-validation of information across a plurality of image blocks taken from the captured image, which image blocks are deconvolved using parametric deconvolution to constrain modifications to the point spread function.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 3a-3b illustrate examples of a Cepstrum and an associated PSF extracted from sensor output, respectively.

FIG. 4a illustrates an accumulator plan from an original Radon transform of a PSF before and after thresholding in the top and bottom illustrations, respectively.

FIG. 4b illustrates a PSF reconstruction (bottom illustration) from the nine lines provided by a thresholded Radon transform of FIG. 4a, wherein the linearity coefficient is equal to the area of the white shape from the reconstructed PSF normalized by the original PSF area (top illustration).

FIGS. 5a-5b illustrate a simulated case of a one-dimensional PSF and its non-thresholded neg-Cepstrum, respectively.

DETAILED DESCRIPTIONS OF THE EMBODIMENTS

Figure 1:
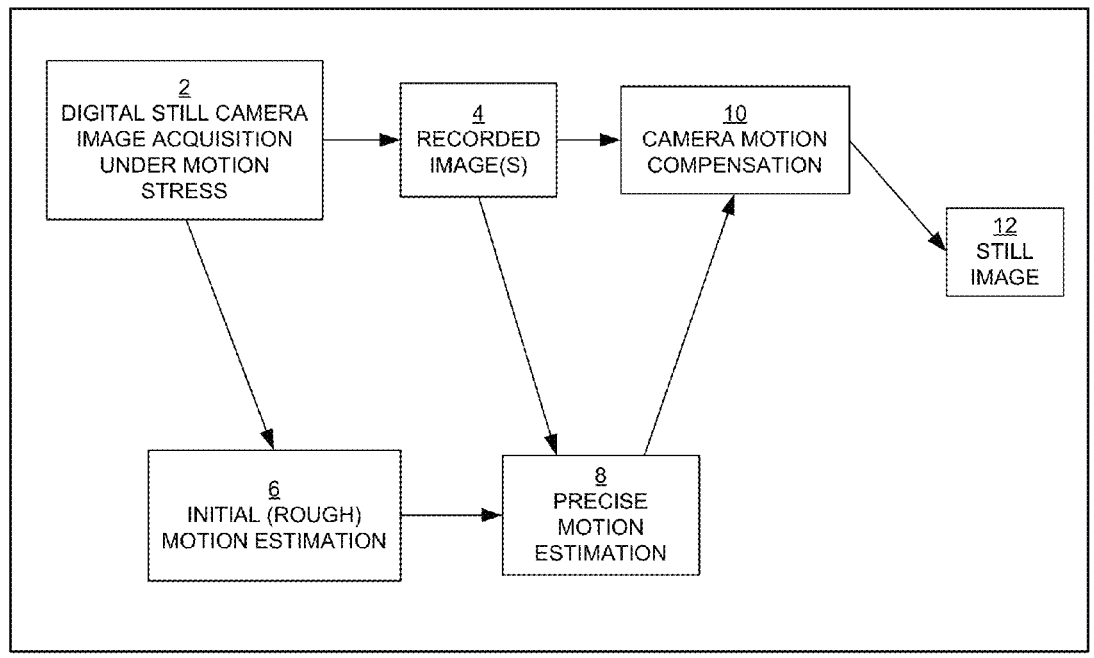
FIG. 1 is a block diagram that schematically illustrates a technique in accordance with certain embodiments.

Several embodiments of Applicants' invention are described below. In one embodiment, a method of adaptive motion estimation and deblurring of acquired digital images is provided. The method involves acquiring multiple digital images with a moving digital image acquisition device that includes an image sensor, including a relatively sharp, under-exposed reference image and a blurred image. An initial approximate point spread function (PSF) is estimated that corresponds to the moving of the device during the acquiring of the multiple digital images. A different DC offset point is generated and a second PSF is calculated based on the different DC offset point. A Cepstrum is calculated and the PSF is refined to generate a third PSF based on the Cepstrum. The method further involves precisely determining a position of a first PSF point, and deblurring at least one of the digital images using a best found PSF based on the third PSF and first PSF point.

The estimating of the PSF may involve the use of a pair of gyro sensors or accelerometers, or a combination thereof. The offset may include a measure of a yaw or a pitch of the image sensor, or both. The calculating of the Cepstrum may involve measuring a linearity of the PSF and/or computing a Radon transform. The method may also include changing a PSF fit that does not pass a distance test from the initial approximate PSF.

In another embodiment, multiple digital images are acquired with a moving digital image acquisition device, including a relatively sharp, underexposed reference image and a blurred image. An approximate point spread function (PSF) is estimated that corresponds to the moving of the device during the acquiring of the multiple digital images. A different DC offset point is generated, and a second PSF is calculated based on the different DC offset point. Multiple crops are chosen from a blurred image and the reference image or an interpolated version of the reference image, or both, and brightness is equalized or balanced between these crops. A second PSF is calculated for a pair of horizontal and vertical offsets. At least one of the digital images is deblurred using a crop of the blurred image and/or the method may include convoluting with a crop of a relatively underexposed reference image.

An error may be computed, and a minimum may be determined using a predetermined search method, e.g., that may involve an Adaptive Rood Pattern Search (ARPS) method. The estimating of the PSF may involve use of a pair of gyro sensors or accelerometers, or a combination thereof. The offset may include a measure of a yaw or a pitch of the image sensor, or both.

In another embodiment, a method of adaptive motion estimation and deblurring of acquired digital images includes acquiring multiple digital images with a moving digital image acquisition device, including a relatively sharp, underexposed reference image, e.g., a preview image, and a blurred image. Offset grid points are chosen from an offset grid in an offset values space based on data of the digital images acquired with the moving device. An iterative process is applied that uses a variable sized window. The process is stopped when an outer low importance border is detected. An approximate point spread function (PSF) is estimated one or more times corresponding to the moving of the device during the acquiring of the multiple digital images based on the choosing, applying and stopping. At least one of the digital images is deblurred using a best found PSF.

The offset may include a measure of a yaw or a pitch of the image sensor, or both. The method may also include determining that the reference image is too dark, and amplifying pixel values of the reference image, including avoiding saturation. The method may include aligning or registering the reference image and the blurred image, and the reference image may be re-sized to the size of the blurred image.

One or more processor-readable media are also provided that have code embedded therein for programming a processor to perform a method of adaptive motion estimation and deblurring of acquired digital images in accordance with any of the methods described herein.

A digital image acquisition device is provided that includes a lens and an image sensor for acquiring a digital image, a processor, and one or more processor-readable media having code embedded therein for programming the processor to perform a method of adaptive motion estimation and deblurring of acquired digital images in accordance with any of the methods described herein.

There are many methods for digital camera motion compensation. One of the most used techniques relies on a pair of inertial sensors that measures the camera displacement over the image principal axes. The inertial sensors class includes the gyroscopic ones, that measure the relative rotation towards their inner axes and accelerometers that measures the relative acceleration. The gyroscopic sensors provide voltage proportional with the angular velocity, while accelerometers provide voltage dependent of the instantaneous acceleration, which for determination of the shift requires double integration.

A pair of gyroscopic sensors that measure the yaw and the pitch components of the movement are the most widely used solution for compensating the camera motion. However, the errors caused by the lost of the translational component of the movement or the ones due to the lack of precision in gyro-sensors measurements, impede the achievement of a good quality in the restored image.

On the other hand, in the literature are mentioned other means of camera motion estimation. If these means involve only blurred image analysis, then are referred as blind image deconvolution techniques. However, such proposed solutions, suffer also from the lack of precision and, thereby lead to lack of quality in the resulting and supposed "still" image.

Other categories of method used for solving the motion problem propose intermediate devices. For instance E. Steinberg and others in U.S. Patent 2007058073 called "Method of Determining PSF Using Multiple Instances of a Nominally Scene" extract information about the camera motion by comparing the blurred imaged with a non-blurred one (e.g. the preview). The image pair idea is reloaded by Yuan and others in "Image Deblurring with Blurred/Noisy Image Pairs" article published at Siggraph 2007. Furthermore, the use of inertial sensors in conjunction with a image pair may aim to overwhelm the results achieved by mentioned methods.

A general flow-chart of the mention method is in FIG. 1. For long-exposed pictures, due to the natural hand jitter, there are significant chances that the resulting picture is degraded by motion blur. Immediately after acquisition, the hereby apparatus will produce an initial (and most likely not very accurate) step of the camera trajectory estimation. The further processing imply the use of the recorded image(s) in a refinement step which will lead to the exact camera motion estimation. After coding the exact camera motion in a Point Spread Function (PSF), the hereby described apparatus will perform image deconvolution to obtain a corrected and a not affected by motion blur version of the photographed still image.

FIG. 1 schematically illustrates an overview of a technique in accordance with certain embodiments. The technique of FIG. 1 involves a digital still camera (DSC) or camera-phone or other portable camera-enabled appliance. The technique of FIG. 1 includes image acquisition under motion stress 2. An acquired image is stored or recorded 4. Initial (rough) motion estimation 6 is optionally provided in the technique of FIG. 1. Precise motion estimation 8 may be performed after image recordation 4 and/or rough motion estimation 6. Camera motion compensation 10 follows image recordation 4 and/or precise motion estimation 8. A still image is generated 12 per application of the camera motion compensation 10.

Estimating PSF Using a Pair of Gyro Sensors

Rough motion estimation 6 may involve approximating a PSF using a pair of gyro sensors. In rough motion estimation 6 according to this embodiment, the pair of gyroscopic sensors produce a response proportional with a rotational component. While acquiring an image 2, signals of the gyro sensors may be digitized in a number of N samples. These may be angular velocities that are integrated to obtain angular displacements. Using some predetermined constants, the angular displacements may be transformed in a set of N points of displacements (represented in pixels). The displacements may be represented with a floating number model. These points may be placed on a discrete grid and each PSF pixel may have a weight proportional with a number of points falling into its limits. The PSF should preserve the image energy constants, so its value should sum to 1.

Also, a pair of accelerometers can be used to estimate camera trajectory. In this case, the sampled sensors signal may be integrated twice and a noise correction technique may be added.

Generating Different Dc Offset Point and Calculating the Corresponding PSF

The estimated PSF may be modeled as a parametrical function of a global sensor offset. The refinement step may include an operation of optimization that fits the resulting PSF over the Cepstrum as function of the input parameters. In this case, the parameter list includes a global horizontal offset and a global vertical offset.

There may be other variants of the parameter list. For example, a partial sensor offset may be involved in certain embodiments. Considering the horizontal channel, there may be defined one offset value for a first half of a number of samples and another value for the second half. An algorithm of division (with increasing number of parameters) may continue until the number of parameters equals the number of samples, and it may be applied to another channel.

Figure 2:
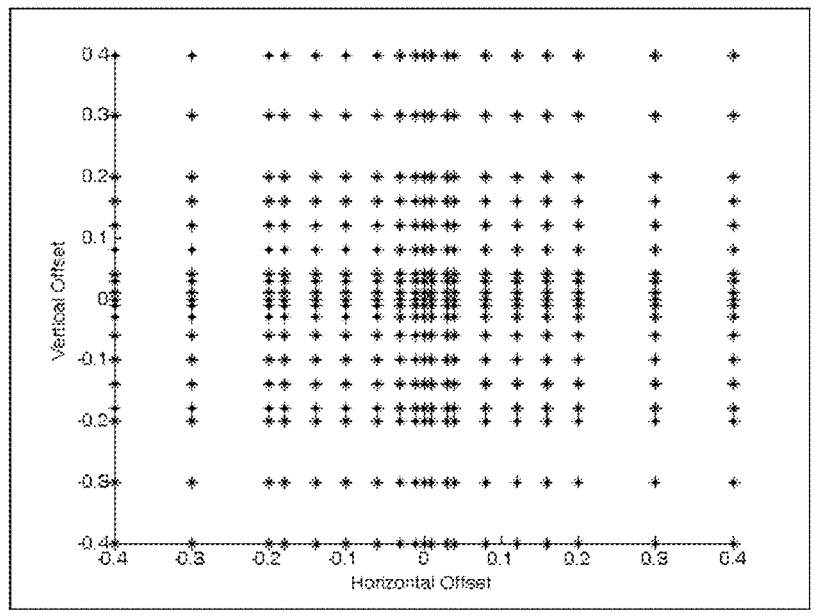
FIG. 2 illustrates an example of a bi-dimensional grid with horizontal and vertical offsets.

The PSF may be modeled as a parametric function. The parameter space, which forms a support for the function, may be spanned by an exhaustive search and the coordinates of the optimum point may be chosen to mark the best PSF. That corresponds to a grid of points in the offset values space. An example is illustrated at FIG. 2, which maps vertical offsets on the y-axis with horizontal offsets on the x-axis in a bi-dimensional grid representation.

One parameter in the parameter space may be the offset of the sensor measuring the yaw, while a second may be the offset to the gyro-sensors measuring the pitch. Such a choice allows compensation of some known errors. The offset may vary from the moment of its calibration to the moment of actual acquisition. Also, the choice allows the compensation of a uniform translational movement.

Calculating the Cepstrum and Refining the PSF

A Cepstrum of a blurred image may reveal a shape of the PSF used for blurring the image. United States published patent application 2007/0296833 is incorporated by reference as providing detailed descriptions of certain embodiments in this regard.

In certain embodiments, information received from the gyroscopic sensors is used to fit the PSF over the Cepstrum, thereby providing an advantageously accurate version of camera movement estimation. The gyroscopic sensors may provide information about PSF weights and form a valuable starting point, while the Cepstrum may be used in bringing information to find a precise trajectory (PSF support). However, it is not always easy to detect (even manually) the shape of a PSF in the Cepstrum. FIGS. 3a-3b illustrate examples of a Cepstrum and an associated PSF extracted from sensor output, respectively. There are two choices, including the original PSF and a symmetrical version.

Variation of offsets can lead to changes of PSF shifts. For example, an increase of the vertical offset for the data used in FIG. 3b can tend to make the PSF appear similar to a closed "8" shape.

Taking into account the way that a Cepstrum can provide relevant information (see examples below), a small modification in the computation manner may be applied where positive values (like a continue component) are set to zero, while negative values (like the peak marking the end of the PSF) are turned to positive values.

A first step in performing a fit in accordance with certain embodiments involves matching an extreme point of the PSF with the center of the Cepstrum. The extreme point may be the farthest PSF point on a direction, e.g., the point placed as top-left, top-down, etc.). The point from the center may be called the first point, while the extreme point from the opposite direction may be called the last point of the PSF.

A method and criteria used in certain embodiments for measuring the fit of the PSF over the Cepstrum may be described as follows. First, an observation is utilized that a linear and a curved PSF behave differently. The method may start with measuring the linearity of a PSF. This may be based on a Radon transform, which is the same as a Hough transform for lines, of the binary PSF (e.g., all the non zero-PSF points are turned to 1). It results in an accumulator image, which is normalized so that a linear PSF will produce a maximum value equal to 1. The accumulator plan may be thresholded at 0.3, while smaller values are set to 0. Lines corresponding to a few remaining values may be compared to a PSF for an incomplete reconstruction. There may result some PSF positions that are placed along lines selected by large values of the transform. The number of these positions may be normalized by the total number of the original PSF points to form the linear coefficient ($L_C$). FIGS. 4a-4b provide an example of how the calculus of the linear coefficient may proceed in accordance with certain embodiments.

In these embodiments, a first criterion of the mentioned fit, $M_1$ is the percentage of the PSF pixels that match over zero values in the neg-Cepstrum. For example, see FIGS. 5a-5b, $$M_1 = \frac{\text{Count}(\text{Cepstrum}(PSF) > 0)}{\text{Count}(PSF)}$$

The M1 value may be modified due to positive values near a spike in the plots of FIGS. 5a-5b, which usually appear for linear PSFs:

If ($L_C$, >0.8) and ($M_1$>0.75) then $M_1$=1

FIG. 4a illustrates an accumulator plan from an original Radon transform of the PSF from the top right before thresholding (upper picture in FIG. 4a) and after thresholding (lower picture in FIG. 4). After thresholding, there may be left nine points in this example. In the lower representation of FIG. 4b, the PSF reconstruction from the nine lines provided by the thresholded Radon transform is illustrated. The linearity coefficient is equal to the area of the white shape from the lower representation in FIG. 4b (reconstructed PSF) normalized by the original PSF area as illustrated in the upper representation in FIG. 4b. That area is equal to 0.6 in this example.

FIGS. 5a-5b illustrate a simulated case of a one-dimensional PSF (FIG. 5a) and its non-thresholded neg-Cepstrum (FIG. 5b). The PSF has random values in the [90,110] range.

The neg-Cepstrum exhibits a positive spike 20 points away from its center. In the range defined by [center, spike] most of the values are negative. The values near the spike become positive and, sometimes (depending on the PSF values), points from the center, also, remain positive.

Given a PSF, dilation may be used in certain embodiments with the structuring elements SE1 and SE2, illustrated in Table 1 below (if the general direction is closer to 45°) or with SE3 and SE4 (if the general direction is closer to 135°) to inspect points from one side and respectively from the other side of the PSF.

TABLE 1

| SE1 = [0 0 0 1 1 1 1; | SE2 = [0 0 0 0 0 0 0; |
|---|---|
| 0 0 0 1 1 1 1; | 0 0 0 0 0 0 0; |
| 0 0 0 1 1 1 1; | 0 0 0 0 0 0 0; |
| 0 0 0 1 1 1 1; | 1 1 1 1 0 0 0; |
| 0 0 0 0 0 0 0; | 1 1 1 1 0 0 0; |
| 0 0 0 0 0 0 0; | 1 1 1 1 0 0 0; |
| 0 0 0 0 0 0 0]; | 1 1 1 1 0 0 0]; |
| SE3 = [1 1 1 1 0 0 0; | SE4 = [0 0 0 0 0 0 0; |
| 1 1 1 1 0 0 0; | 0 0 0 0 0 0 0; |
| 1 1 1 1 0 0 0; | 0 0 0 0 0 0 0; |
| 1 1 1 1 0 0 0; | 0 0 0 1 1 1 1; |
| 0 0 0 0 0 0 0; | 0 0 0 1 1 1 1; |
| 0 0 0 0 0 0 0; | 0 0 0 1 1 1 1; |
| 0 0 0 0 0 0 0]; | 0 0 0 1 1 1 1]; |

Figure 6A:
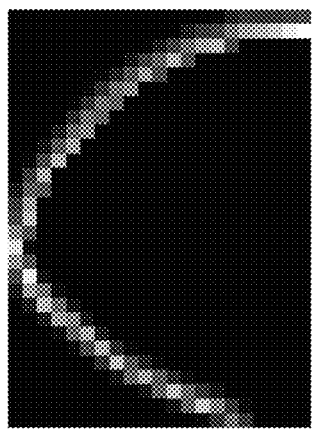
FIGS. 6a-6b illustrate a curved PSF and a corresponding neg-Cepstrum, respectively.
Figure 6B:
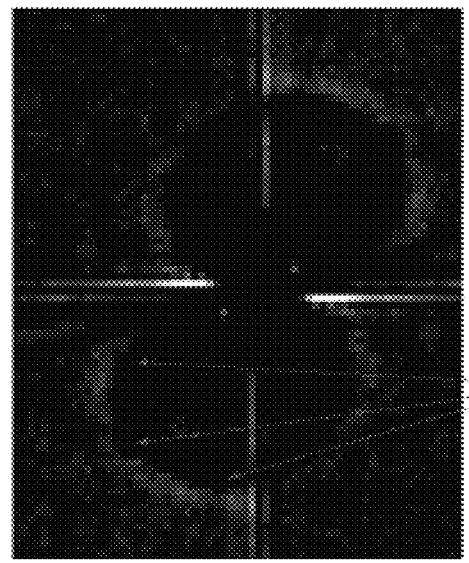

If the PSF is curved as in the example illustrated at FIGS. 6a-6b which illustrate a curved PSF and corresponding neg-Cepstrum, respectively, then in the neg-Cepstrum, on one side of the PSF, there will be significant values while on the other side there will be zero values. The arrows in FIG. 6b mark a maximum area that should fit near the PSF.

The shape that is dilated is the part of the PSF that remains after fitting the linear part over the original form (the difference being the lower representation of FIG. 4b subtracted from the upper representation of FIG. 4b). This shape will be dilated with SE1(3) and, respectively, SE2 (4) to form the so-called PSF1 and PSF2.

Two terms may be formed, $k_1$ and $k_2$ by:

$$k_1 = \frac{\text{Sum}(\text{Cepstrum}(PSF1))}{\text{Count}(PSF1)}; k_2 = \frac{\text{Sum}(\text{Cepstrum}(PSF2))}{\text{Count}(PSF2)}$$

In the second criterion, the term $M_2$ may be computed as:

$$M_2 = 2(1-L_C)||k_1-k_2|$$

The third criterion may rely on the observation that a linear PSF ends up with a spike. Therefore, values from a 3×3 area surrounding the last point may be counted. The sum of these neg-Cepstrum values multiplied with twice the linearity coefficient gives $m_3$. The $m_3$ values may be computed for the considered PSF. The third criterion measure may be given by:

$$M_3 = \frac{m_3}{\max_{all\ PSF}(m_3)}$$

The measure of a PSF fit may be given by:

$$PSF_{measure} = M_1 + M_2 + M_3$$

The measure may be changed if the PSF doesn't pass a distance test from the initial PSF. The accepted distance may be dependent on the probability of one motion kind (linear or non-linear) to appear. The shape, weight and the grip of the apparatus may be factors that modify the kind of movement.

For each PSF, the first point may be fit over the neg-Cepstrum center, as well as the last point. Therefore, for each PSF, two scores of the fit may be computed. A PSF final score may be retrieved by getting the maximum values from the two cases (center-first and center-last).

Figure 7:
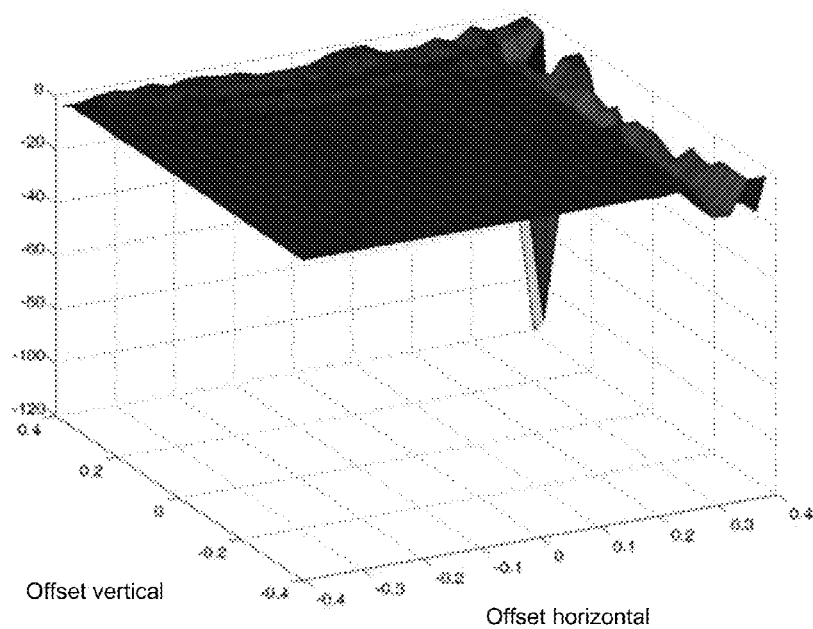
FIG. 7 illustrates an example of how an objective function looks if represented for possible values of offset.

FIG. 7 illustrates that the measure of the fit may not be a monotonic function of input parameters. An intelligent search algorithm (e.g., like steepest descent or conjugate gradient) may not work, such that an exhaustive search would be used instead, i.e., computing the function in all of the points of the support space. FIG. 7 illustrates an example of how an objective function, M, looks if represented for the possible values of the offset. The 3D plot in FIG. 7 notably lacks monotonic behavior. The flat area in the 3d plot of FIG. 7 originally had positive values, but they were removed for better view. FIGS. 8a-8d and 9a-9d illustrate examples of the method providing clearly advantageous benefits.

Figure 8A:
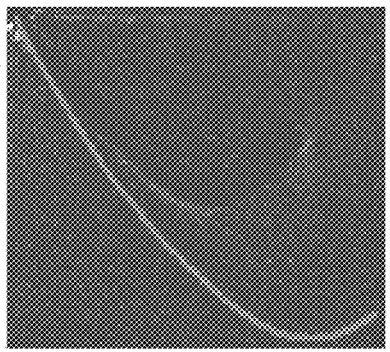
FIGS. 8a-8d illustrate examples of PSF adjustment in accordance with certain embodiments, wherein an original picture was blurred by natural hand jitter.
Figure 8B:
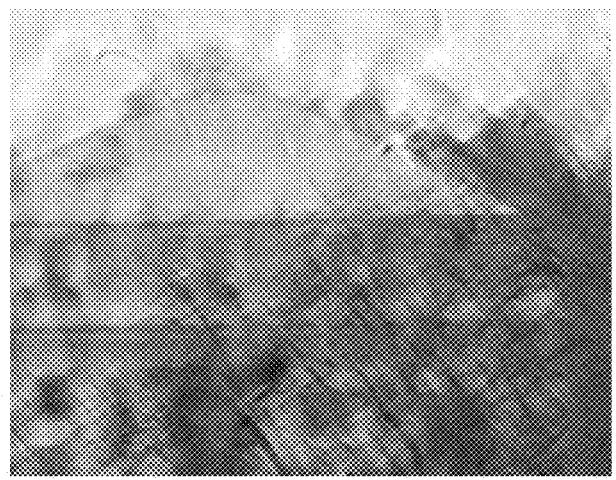
Figure 8C:
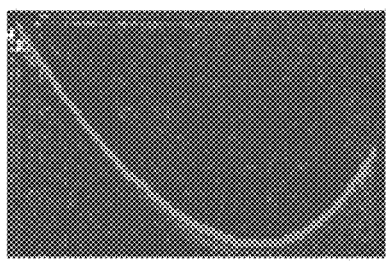
Figure 8D:
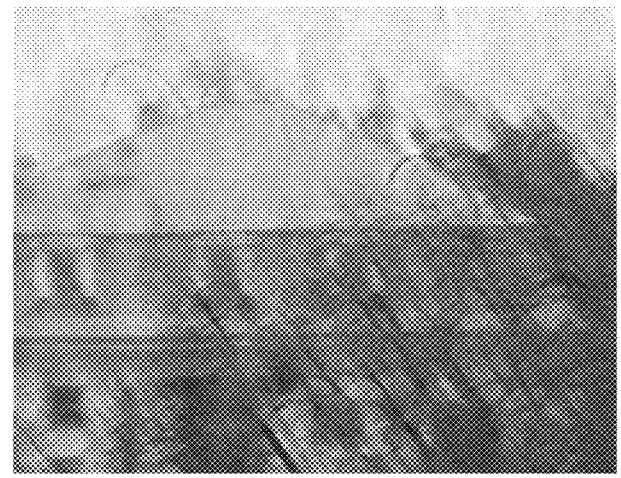

FIGS. 8a-8d illustrate examples of a PSF adjustment method in accordance with certain embodiments. In the example of FIGS. 8a-8d, an original picture was blurred by natural hand jitter. FIG. 8a shows a plot of an initial PSF. The Cepstrum is represented above the initial PSF plot in FIG. 8a. FIG. 8b illustrate a crop of the blurred image restored with the initial PSF from FIG. 8a. FIG. 8c illustrates a refined PSF. In this example, the PSF size is large, so the restored image does not have a very good quality compared with other embodiments. FIG. 8d illustrates an image restored with the refined PSF from FIG. 8c.

Figure 9A:
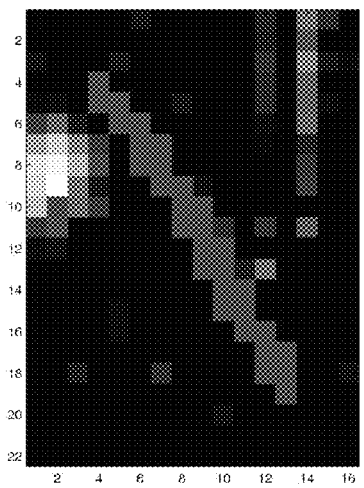
FIGS. 9a-9d illustrate another example of PSF adjustment in accordance with certain embodiments.
Figure 9B:
Figure 9C:
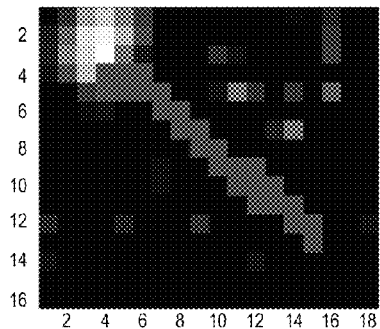
Figure 9D:

FIGS. 9a-9d illustrate another example of a PSF adjustment method in accordance with certain embodiments. FIG. 9a illustrates an initial PSF appearing substantially as a diagonal line diagonally though the center. Behind the PSF plot in FIG. 9a appears parts of the Cepstrum. FIG. 9b illustrates a crop from a blurred image restored with the original PSF from FIG. 9a. FIG. 9a illustrates a refined PSF in accordance with certain embodiments. In this case contra FIGS. 8c-8d, the PSF size is small, and so the restored image has a good quality. FIG. 9d shows the image restored with the refined PSF from FIG. 9c.

Determining an Approximately Exact Position of a First PSF Point

Above, there was determined a best PSF. This PSF started in the center of a pixel. In practice, this may not always be the case, and so the relative coordinates of the first PSF point may be adjusted. The first measured point (coming from the first record of the gyroscopic sensors) may be placed in a center of a PSF pixel. Sub-pixel shifts of the mentioned point may be tried. A discrete step for a shift may include a function (determined through experiments with hand jitter in respect to camera and exposure time) of a number of one or more gyroscopic samples, N. The resulting PSF may be constructed, and their fit on the Cepstrum may be measured either as described above or by computing a similarity measure between the blurred image Cepstrum and a PSF Cepstrum. Examples of similarity measures include L2 distance and cross-correlation.

Finally, an entire image may be deblurred using a best found PSF. Further embodiments are described below.

A full resolution blurred image and a preview image (e.g., an image of a same scene as the blurred image except at a reduced resolution) may be used in an advantageous technique. The preview may be resized to the size of a full resolution blurred image and aligned with it using any known image alignment method. Nearest neighbor or bilinear interpolation can be used for resizing the preview. Compact crops may be considered from both images (e.g., blurred and interpolated preview images). The typical size of each crop may be 128×128 pixels. A fast searching algorithm may be implied for finding a best PSF.

In an example of this embodiment, an approximate PSF may be estimated using a pair of gyro sensors and/or accelerometers as described in the previous embodiment. Different DC offset points may be determined, e.g., just as described in the previous embodiment. In this embodiment, however, a next step involves choosing crops from the blurred image and an interpolated preview, as well as equalizing brightness between the crops. Crops may be chosen according to a pre-defined scheme. The user may select an area that is most interesting and information may be retrieved from that area and used in the refining algorithm. Another option is to choose an area of interest, e.g., an auto-focus area, which is expected to be sharp. In many cases, there may be an important brightness difference between a preview and a blurred crop. An intermediate crop image may be computed from the initial crop preview.

One possibility to obtain an intermediate crop image may be to perform a linear regression between corresponding points of an interpolated crop and a blurred crop (see, e.g., G. H. Golub and C. F. Van Loan, Matrix Computations. John Hopkins University Press, Baltimore, Md., 3rd edition, 1996, and US 2008/0219581, and US2009/0167893, each being hereby incorporated by reference). Two vectors may be obtained from the pixel values of previous matrices by column-wise ordering ($x=(x_i)$ and $y=(y_i)$). We have pair of data $(x_i, y_i)$ for $i=1,2,\ldots,n$, where n is the total number of grid points from each image. The least-squares technique is used for finding a linear regression of the form $y(x)=c_1 x+c_2$. We define the matrix $$v = \begin{pmatrix} x_1 & 1 \\ x_2 & 1 \\ & \\ x_n & 1 \end{pmatrix},$$

where $x_i$ is the pixel value of the preview point. The coefficient vector c is obtained by solving the linear system $V^T V c = V^T y$. The linear system can be solved with any of several known methods. The intermediate image pixel values may be obtained by multiplying with $c_1$ the pixel values of the interpolated crop image and adding $c_2$ to the result.

Compute PSF, Deblur/Convolute Crops

As described in more detail below, next steps include computing the PSF for a pair of horizontal and vertical offsets. The PSF may be used to deblur the blurred crop or to convolute with an under-exposed crop. An error can be computed. A search method can be used to look for a minimum.

Figure 10:
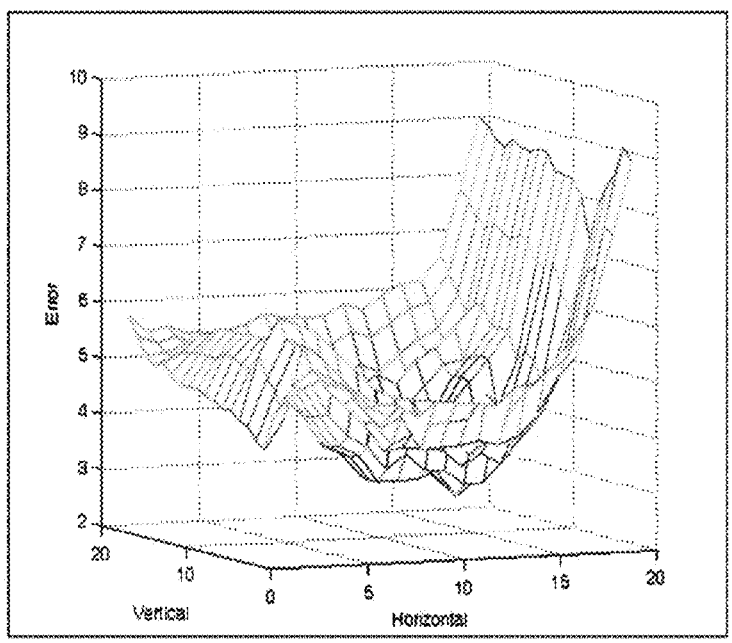
FIG. 10 illustrates a normalized error between blurred and intermediary blurred pictures for different horizontal and vertical offsets.

The difference image between the intermediate crop image and the de-blurred crop image obtained by using the PSF and any known de-blurring method (e.g. Wiener, Lucy-Richardson, Cepstrum etc.) may be computed. The de-blurring error may be given by the energy of the difference image. Also, the sum of absolute difference values can be used instead of the energy. FIG. 10 shows a normalized de-blurring error using the sum of absolute difference and the possible PSF's. The error surface may not be strictly uni-modal, but the global minimum can be found when the crops have close brightness values. An advantage of using an intermediate image instead of the preview crop image is that the dynamic range of the computed de-blurring error is greatly reduced.

In another variant, the difference image between the convolution of the computed PSF and the intermediate crop image and the blurred crop image is computed. This approach doesn't choose a PSF that advantage a specific de-blurring method. It is the preferred variant, since it is less numerically complex.

Figure 11:
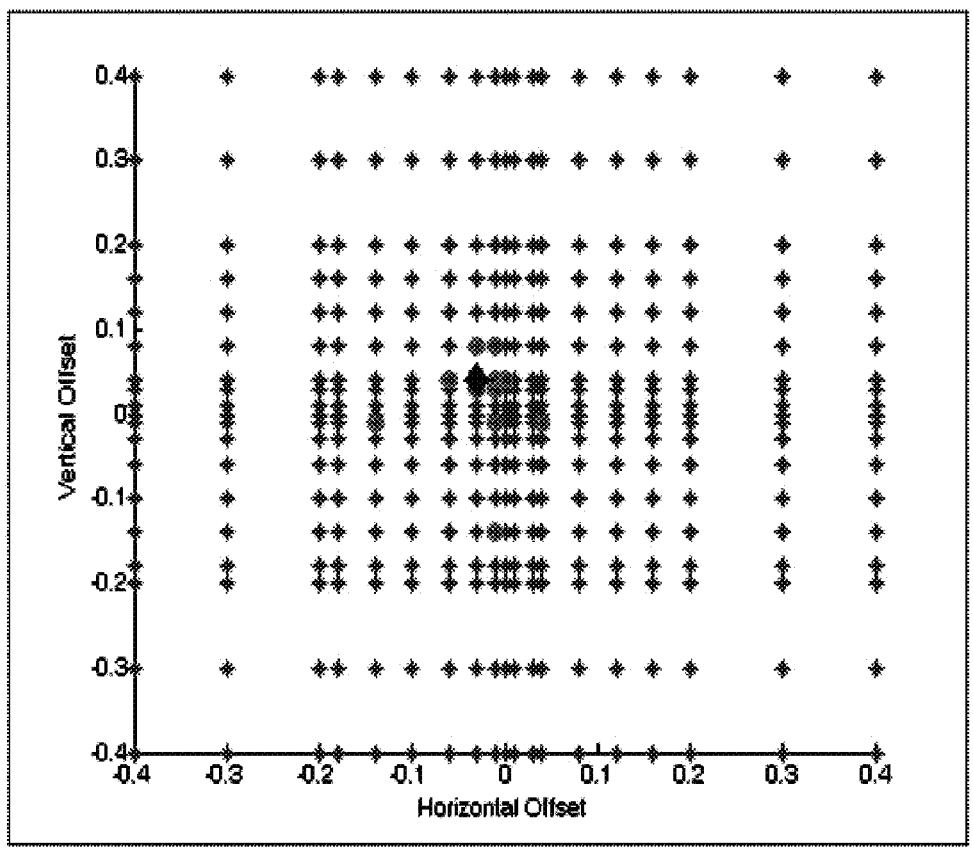
FIG. 11 illustrates a grid such as that illustrated at FIG. 2, wherein the stars indicate the possible offset values, the red circles indicate search points used by an ARPS method, and the black diamond indicates a minimum error obtained by ARPS that coincides with those obtained by the full search method.

In order to reduce the numerical complexity required by performing these operations for all the considered offsets, a typical search algorithm is then performed in order to find the offsets that give the minimum de-blurring error. FIG. 10 illustrates a 3D graph of normalized error between blurred and intermediary blurred pictures for different horizontal and vertical offsets. In FIG. 10, the minimum corresponds to (8,13). Many such algorithms can be found at http://www.ece.cmu.edu/~ee899/project/deepak_mid.htm or B. Furht, J. Greenberg, and R. Westwater, Motion estimation algorithms for video compression, Kluwer Academic Publishers, 1997, each being hereby incorporated by reference. Therefore, only a subset of possible PSF's are computed in order to find the best PSF. For example, an Adaptive Rood Pattern Search method (ARPS) may be used (see, e.g., Y. Nie and K. K. Ma, Adaptive rood pattern search for fast block-matching motion estimation. IEEE Trans.Image Processing, 11(12), December 2002, incorporated by reference). Only 12 PSF's are computed instead of 361 possible PSF's given by 19 horizontal and vertical offsets. The stars appearing in the vertical offset vs. horizontal offset plot of FIG. 11 indicate possible offset values. The red circles indicate search points used by the ARPS method. The black diamond indicates the minimum error obtained by ARPS that coincides with those obtained by the full search method. Depending on the search method, de-blurring method and the measured sensor signals, the number of computed PSF's varies between 3%-9% of all possible PSF's. In the examples above, it is assumed that the offsets are fixed. However, some small variations in time of the offsets around their average value are possible due to temperature change or electronic circuit parameters drift. Also, a hand tremor measured signal can be modeled well as an AR process, especially in case of low sampling rate. Therefore, different PSF's can also be obtained altering the measured signals with time variable functions or approximate signals.

Deblur Entire Image Using Best Found PSF

The best found PSF that corresponds to the minimum error may now be used to deblur a full resolution blurred image.

In yet another embodiment, a full resolution blurred image and a preview are used, similar to the just-described embodiment. An under-exposed preview image may be designated "f" in this example (having the size [M×N]), and a full resolution blurred image may be designated "g" in this example (with the size [P×Q]). In this example, we will typically have P>M and Q>N. The indications of the sensors are optional.

Pre-Processing of Images

Preview image pixel values may be amplified avoiding pixel saturation in case the image preview is too dark (same or similar step as described at US published applications nos. 2009/0167893, 2008/0219581 and/or 2009/0303343, which are incorporated by reference can be used here). An image alignment might be used as well, before applying an adaptive procedure using preview and blurred images. The preview is resized to the size of the full resolution blurred image and aligned with it using any of several available techniques. Nearest neighbor or bilinear interpolation can be used for resizing the preview. If there is a small displacement between these pictures (e.g. less than 10 pixels), the next step may be performed on the preview and the blurred image. Otherwise, the procedure may be performed on the interpolated aligned preview image and the aligned blurred image (both having the size [R×S]).

Choose Grid Points, Apply an Iterative Algorithm Using a Variable Sized Window, and Stop the Algorithm at an Outer Low Importance Border In case of using the initial preview and the blurred image, the corresponding grid points may be chosen in accordance with certain embodiments as follows: a grid of points is selected from the preview image, $f(i_p, j_p)$. The corresponding points of the grid on the full resolution image, $g(i_r, j_r)$ are found by taking the ratio between the sizes of the full resolution image and the preview image:

$$r_r = \left[\frac{P}{M}\right]; i_i = r_r i_p; r_c = \left[\frac{Q}{N}\right]; j_i = r_c j_p;$$

Usually $r_r = r_c = r$.

Figure 12:
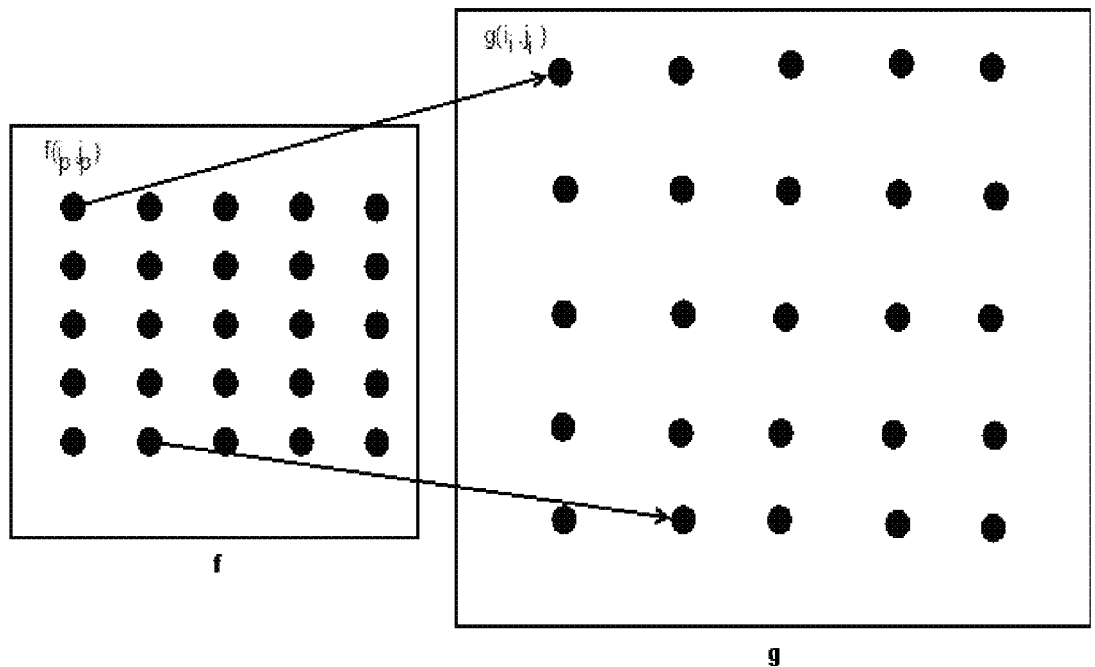
FIG. 12 illustrates corresponding grid points from a preview image, f, and a full resolution image, g.

FIG. 12 illustrates corresponding grid points from a preview image f and a full resolution image g. When using an interpolated aligned preview image and an aligned blurred image, the corresponding points may have the same coordinates in both images.

A 2D convolution may be considered as involving for each of a number of pixels, replacing a pixel with a weighted sum of its neighbors. The weights are the corresponding values of the PSF. The corresponding linear system is intractable due to the huge number of equations and, therefore, often a poor invertible data matrix leads to a wrong estimation of weights. Also, the PSF support size may be unknown, and known estimation methods may not be too exact.

The PSF may be estimated using a coarse-to-fine approach (see, e.g., R. Fergus, B. Singh, A. Hertzmann, S T. Roweis, W T. Freeman, "Removing Camera Shake from a Single Photograph", ACM Trans. on Graphics, Vol. 25, Issue 3, pp. 787-794, (Proc. SIGGRAPH 2006), hereby incorporated by reference). The start may be with a null PSF of size 5×5. For each grid point of the low resolution image, we may select a block of $(2k+1)^2$ pixels Fk surrounding a grid pixel (k=2 for this initial step). At iteration n, the PSF values may be $h_{l,m}^n$, where 1<=2k+1, m<=2k+1. The computed error signal, $e(i_r, j_r)$ may be used for updating the PSF weights:

$$e(i_i, j_i) = g(i_i, j_i) - \sum_{l=1}^{2k+1}\sum_{m=1}^{2k+1} h_{l,m}^n F k_{l,m}.$$

Figure 13:
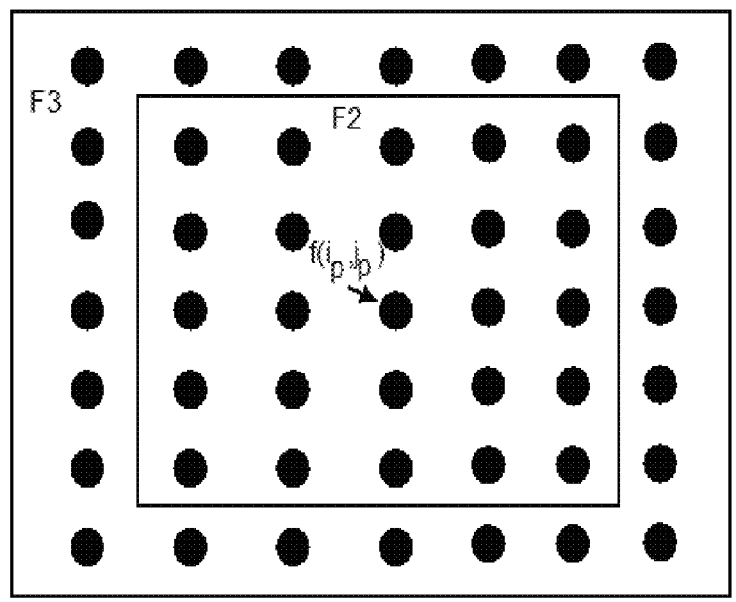
FIG. 13 illustrates blocks of $(2k+1)^2$ pixels of Fk surrounding grid pixel (F2 for k=2, F3 for k=3 etc.), in accordance with certain embodiments.

The filter coefficients can be updated by any suitable adaptive algorithm. An adaptive algorithm that may be selected in accordance with certain embodiments involves a 2-D Least Mean Square (2-D LMS) algorithm (see, e.g., Y. Yitzhakyl and N. S. Kopeika "Identification of Blur Parameters from Motion Blurred Images", Graphical Model and Image Processing Vol. 59, No. 5, September, pp. 310-320, 1997, incorporated by reference). The weights formula may include $h_{l,m}^{n+1} = h_{l,m}^n + \mu \cdot e(i_i, j_i) \cdot Fk_{l,m}$, where $\mu$ is step size. Other 2-D adaptive algorithms can be used as well (e.g. 2-D version of the Normalized Least Mean Square (2D-NLMS), 2-D fast affine projection algorithm (2D-FAPA) (see, e.g., George-Othon Glentis: An efficient affine projection algorithm for 2-D FIR adaptive filtering and linear prediction. Signal Processing 86(1): 98-116 (2006), incorporated by reference), 2-D version max-NLMS, etc. After the weights are updated, a similar procedure is repeated for the next pair of grid points until all grid points are parsed. FIG. 13 illustrates blocks of $(2k+1)^2$ pixels of Fk surrounding a grid pixel (F2 for k=2, F3 for k=3 etc.).

All of the border area absolute values of the PSF (two or more border wide margin) may be much lower than the maximum value of the PSF (e.g. 1/10*max(PSF)). If such a border wide region exists, the previous described procedure may be repeated a few times on all the grid points or until the convergence is attained and there is no significant weights change from one iteration to another. If there are no such low values on the border of the PSF, for the first pair of grid points, the initial PSF weights may be obtained by resizing the last updated PSF to a new increased value of k. For example, the nearest neighbor bilinear or bicubic interpolation can be used. The adapting procedure may be repeated for all grid points, until a wide border region with small weights is detected. The method can be used to detect if the full resolution image is blurred. If the procedure finds a small sized PSF for aligned images (e.g. smaller than 7×7), and it has one big value surrounded by much smaller values, the full resolution image is sharp. A sharpness measure can be determined as well, assuming that the preview image is sharp and has low noise. One such sharpness measure can be a ratio between the biggest PSF value and the sum of absolute values of the other PSF values, but other formulas are possible as well.

At the end, the weights below the chosen threshold related to the maximum PSF values are set to zero. The sum of the weights is scaled to be one. The non-zero part of the PSF is used to deblur the blurred image using any known deblurring method. A distinct PSF can be found on each color channel. Using these PSFs, the deblurring method can be applied individually on each color channel, as well. In another variant, the preview image can be interpolated at the size of the full resolution image.

Figure 14A:
FIGS. 14a-14d illustrate a blurred image, a preview image, a computed PSF (19×17) and a deblurred image using 10 Lucy-Richardson iterations, in accordance with certain embodiments.
Figure 14B:
Figure 14C:
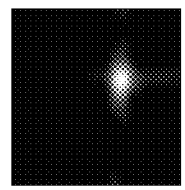
Figure 14D:

If the use of the initial PSF (obtained from the gyro) is refined by the current method, the computation complexity is highly reduced. The starting iteration is optional, because the size of PSF is closer to the final one and the convergence is much faster. FIGS. 14a-14d illustrate results obtained using a preview and the blurred image obtained with a Samsung camera in an example in accordance with certain embodiments. FIG. 14a shows a blurred image. FIG. 14b shows a preview image. FIG. 14c shows a computed PSF (19×17). FIG. 14d shows a deblurred image using 10 Lucy-Richardson iterations

Deblur Entire Image Using the Found PSF

The last step in this exemplary technique may be to deblur the entire image using the found PSF. Any of several available deblurring methods can be used.

Advantages

A two-step PSF Cepstrum based method is provided, and multiple embodiments are described and illustrated herein. A refinement step may involve an optimization method that fits a resulting PSF over the Cepstrum as function of a global horizontal offset and the global vertical offset.

A straight-forward search method may be used for finding a best PSF. The method may select a deblurred image with a minimum kurtosis (see, e.g., Li, D, Mersereau, R. M, Simske, S, Blur identification based on kurtosis minimization, ICIP 2005 (I: 905-908), incorporated by reference). The kurtosis computation may be performed for each of a number of candidate deblurred images. This computation may be more complex than an energy or sum of absolute value of difference images.

A preview image may be optionally not used when computing a validation error. Instead, just image blocks from the captured blurred image may be used. The best parameters for all image blocks may be determined using a generalized cross-validation scheme. The PSF may be iteratively changed and some constraints may be imposed. Conventional procedures may be very complex and may involve many computations in order to attain a convergence of an estimate of the deblurred image or a specified number of iterations. Search methods in accordance with certain embodiments are much more straight-forward and resource efficient than these conventional methods. The point spread function is generally unconstrained and may take into account sensor parameters and optical point spread functions of imaging devices. The PSF may have a different shape and size depending on investigated offsets. The PSF may be directly computed from degraded sensors measurements and may be optionally found iteratively through a parametric semi-blind deconvolution.

Use of a coarse-to-fine approach to find the best PSF with an adaptive filtering algorithm (2D-LMS) on two images (one under-exposed and one well-exposed) is also described and illustrated herein. The method can start from an initial PSF estimation (using sensors or image processing approaches). A sharpness measure computed by using an adaptive filtering on differently exposed images is also provided. Techniquies described herein may be combined with methods described in US20070171987, which is hereby incorporated by reference, although the '987 publication does not describe use of any 2-D LMS algorithm for the estimation of the PSF. The method may use a coarse-to-fine approach to find the PSF using only one blurred image (see also, R. Fergus, B. Singh, A. Hertzmann, S T. Roweis, W T. Freeman, "Removing Camera Shake from a Single Photograph", ACM Trans. on Graphics, Vol. 25, Issue 3, pp. 787-794, (Proc. SIGGRAPH 2006), incorporated by reference). A coarse-to-fine approach may also be used with a Landweber method (see, e.g., Lu Yuan, Jian Sun, Long Quan and Heung-Yeung Shum, Image Deblurring with Blurred/Noisy Image Pairs, SIGGRAPH 2007, incorporated by reference). This method may be applied on blurred/noisy image pairs too.

A better PSF is found in accordance with certain embodiments even when using noisy sensors, low quality previews and severely blurred images. The technology can have a combined hardware/software implementation. It may use sensors and a blurred image or a preview image.

A system in accordance with certain embodiments may contain a pair of gyroscopic sensors and an acquisition board which amplifies, filters, and converts sensor indications to a digital form, and passes them to a PC). Hand jitter signal may be separated from an intentional movement signal (see, e.g., US published patent applications nos. 20090179999, 20090167893, 20080309769, 20080231713, and 20080219581, which are each assigned to the same assignee and incorporated by reference). Matlab software may be used for PSF estimation. In certain embodiments, both a preview picture and a blurred picture may be used.

The techniques described herein may be implemented in a DSC, camera phone, mobile phones or other camera-enabled consumer-oriented or professional electronic appliance. An in-camera hardware implementation may be provided with a processing unit. The fitting PSF method may involve one or more and perhaps many convolutions and/or de-blurring steps on image crops.

The Cepstrum Method

The following discussion elaborates the Cepstrum for several simple cases of PSF. In this discussion, the Cepstrum is described as an example (rather than the neg-Cepstrum).

Let be:
f—original, un-blurred image
h—the PSF
g—the blurred image
C—Cepstrum

Then, the computation may be performed in the spatial domain:

$$g = f \otimes h$$

Or in the frequency domain:

$$G = F \cdot H$$

Absolute values of the spectrum of the Blurred image may be computed as follows:

$$|G| = |=|F \cdot H| = |F| \cdot |H|$$

After applying the logarithm, the result is:

$$\log|G| = \log|F| + \log|H|$$

The inverse Fourier transform is linear. Therefore, the Cepstrum of blurred image is:

$$C_g = \text{Fourier}(\log|G|) = \text{Fourier}(\log|F| + \log|H|) = \text{Fourier}(\log|F|) + \text{Fourier}(\log|H|) = C_f + C_h$$

This calculus leads to the idea that the Cepstrum of the blurred image may be a linear combination (summation) between the Cepstrum of the true image and the Cepstrum of the PSF. This means that some patterns available in the PSF Cepstrum may be revealed by the Cepstrum of the final image too.

Figure 15A:
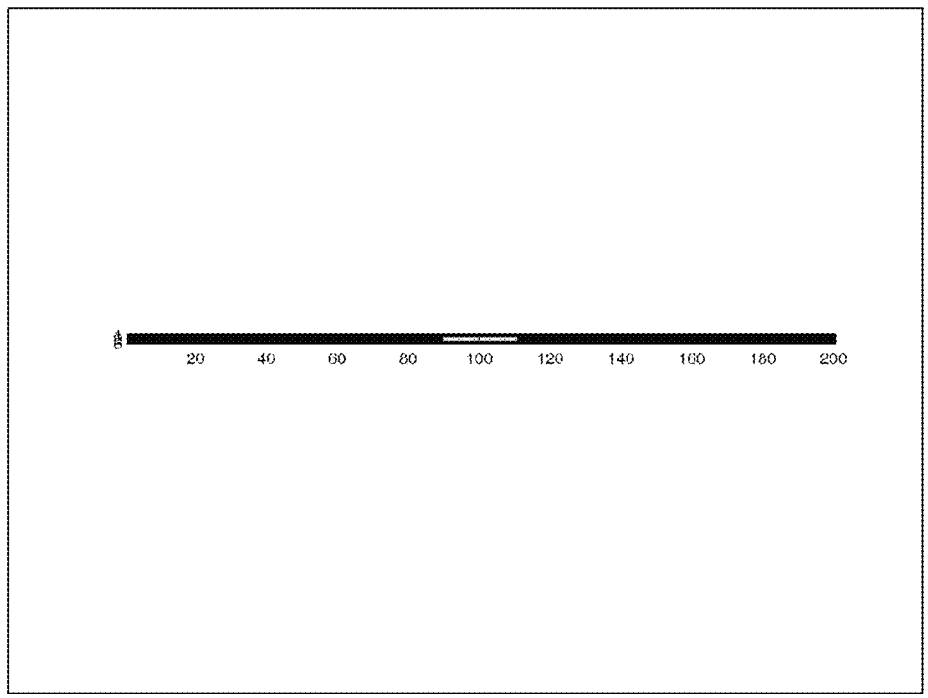
FIGS. 15a-15d illustrate a PSF example in accordance with certain embodiments.
Figure 15B:
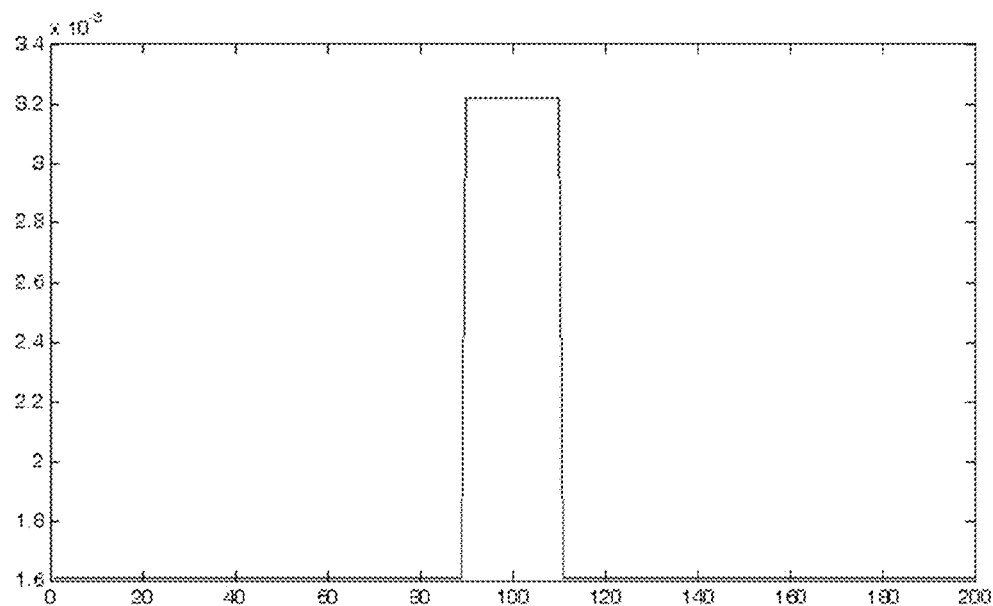
Figure 15C:
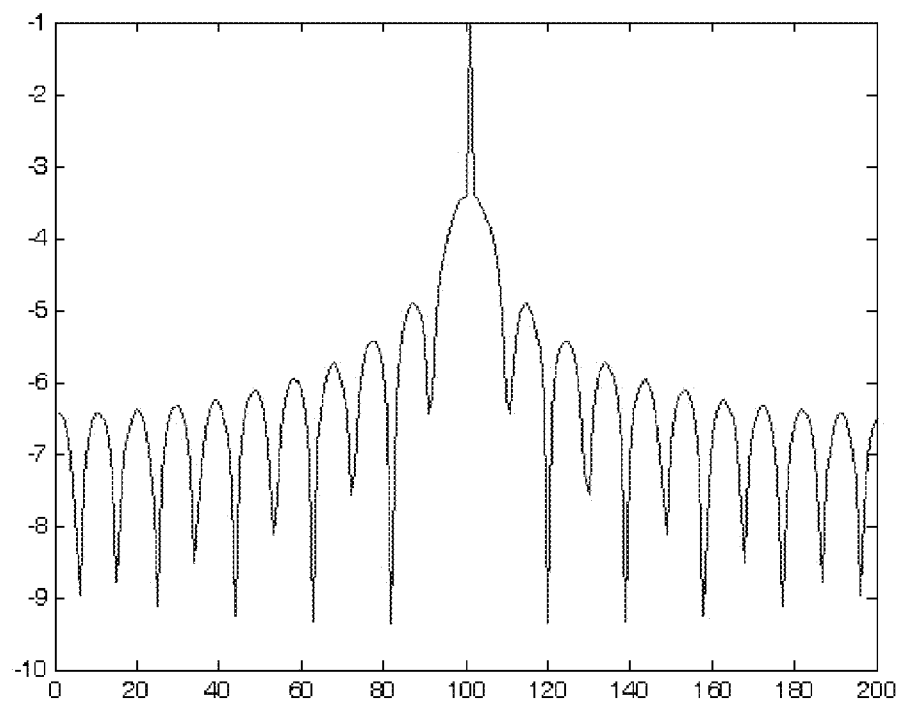
Figure 15D:
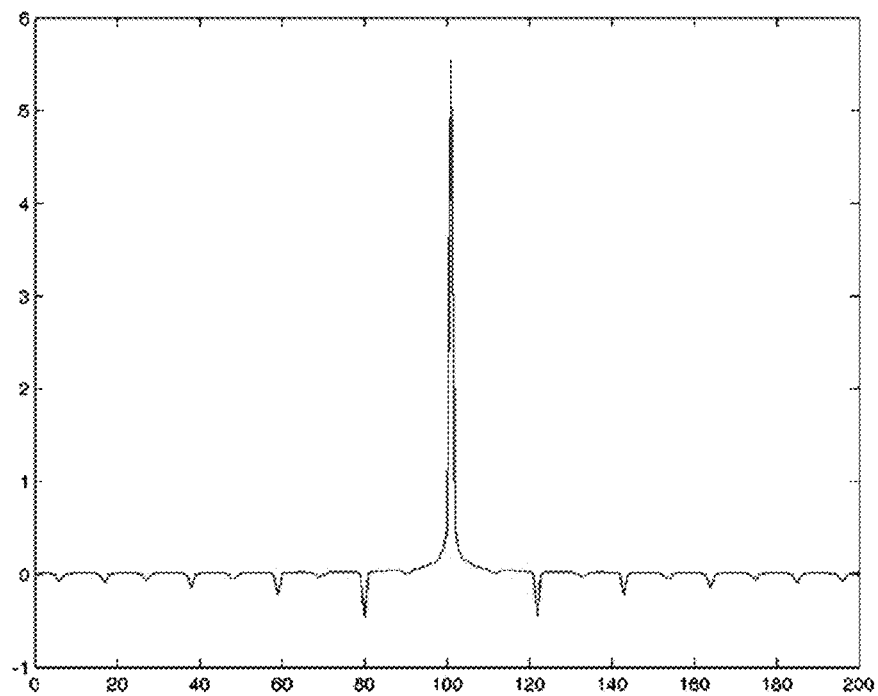

The following PSF example is illustrative: consider a rectilinear motion (follows a straight line) and a uniform motion (no acceleration during the movement). Furthermore, consider movement along a horizontal axis. Then, the PSF looks like the one plotted in FIGS. 15a-15d where illustrate a PSF example. FIG. 15a illustrates an image of the PSF having 3 lines and 200 columns. The movement is along the 2 line and starts from column 90 till column 110 (the white patch). Therefore, the length of the illustrated move is the equivalent of 20 points on a horizontal axis. FIG. 15b illustrates a section through the second line of the PSF. Starting from indices 90 and up to 110, the PSF has non-zero values. For example, N=20 and L=200. FIG. 15c illustrates a log of a spectral power of the considered PSF. A negative peak appears periodically (with X as the period). This is due to the sin part. This means that a large value can be expected in the spatial domain. The value may be placed at N to the center. FIG. 15d illustrates the Cepstrum of the considered PSF, or equivalently, the inverse Fourier transform of the plotted signal. The periodicity in X (illustrated in FIG. 15c) ends up in negative peaks. There is also a periodicity in 2X, which results also in smaller negative peaks. The first negative peaks are placed at distance N from the center (from the continue component).

In certain embodiments, the PSF shape along the second line (which is the one that matters) includes a "box"/"gate" function. Such functions may have the spectrum in form of a $$\mathrm{sinc}(x) = \frac{\sin x}{x}.$$

The "sinc" function will reach the zero value in the points where $x=k\pi$.

In the discrete spectrum case of the discussed function, the first zero is reached in $$X = \frac{L}{N},$$

where L is the length of the Fourier series (and in the case of image-Cepstrum is given by the image size) and N is the width of the gate (see FIG. 15c). Furthermore, a periodicity of zeros appears with the period X, while the log of 0 is negative infinity.

So, in the spectrum, there is a periodic component with a period equal to X. When the inverse Fourier transform is computed, ideally a very large value should come out on the N position. To have an intuition about this issue, one can think about the duality of the Fourier inverse and direct transform. For a signal f:(0;+∞) with a periodical component of period T, in the spectrum there is a large value on 1/T. When transforming back in the space domain, due to the discrete Fourier Transform definition, this (the peak caused by periodicity) will come out in the N position (computed from the center-continuous component).

This case may be extended to a two-dimensional situation. See FIGS. 16a-16c for such an example. This example can be very similar to the first one under the following conditions:
  when the two-dimensional Fourier transform is separable (the 1D Fourier transform is computed first on one axis, and then the 1D Fourier transform is computed for the first result on the perpendicular axis); and
  when the two basis axes (of the two 1D Fourier transforms) are orthogonal (not the primary axes x-y–a rotation will not affect the result)

Figure 16A:
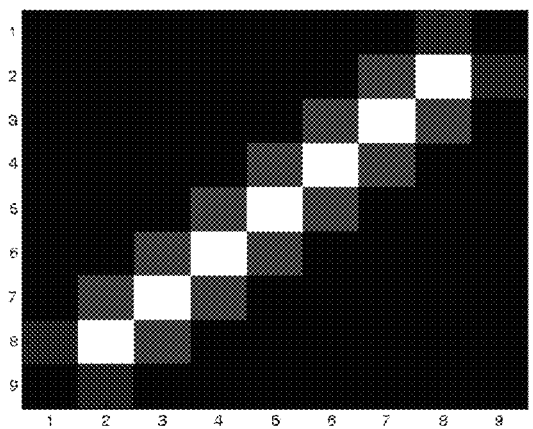
FIGS. 16a-16c illustrate a 2D PSF Cepstrum example in accordance with certain embodiments.
Figure 16B:
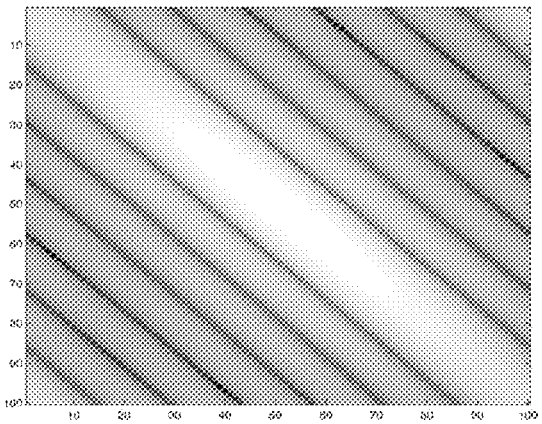
Figure 16C:
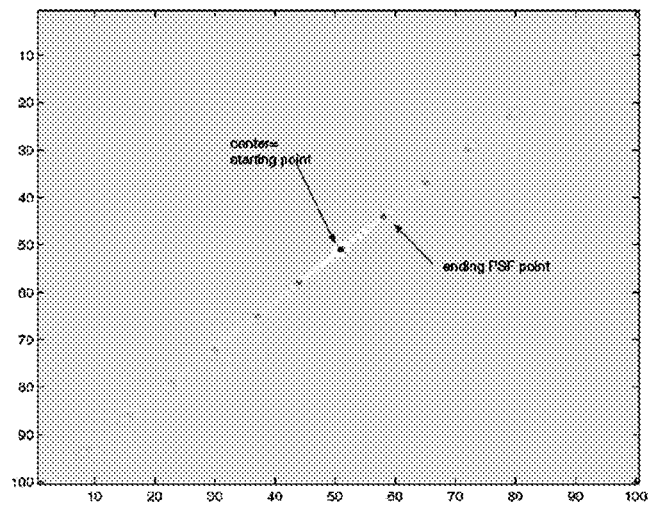

FIGS. 16a-16c illustrate a 2D PSF Cepstrum example. FIG. 16a illustrates an image of a two-dimensional PSF with a length of 7. FIG. 16b illustrates a log of the spectrum of the PSF. The spectrum in this example has 100×100 points. There are periodic large negative values on directions perpendicular to the PSF direction. The distance from the center of the spectrum to the nearest large negative values is equal to the PSF size. FIG. 16c illustrates a Cepstrum of a PSF. The negative spikes come out in the expected places. The distance between the center and the negative spike is equal to the PSF length.

Figure 17A:
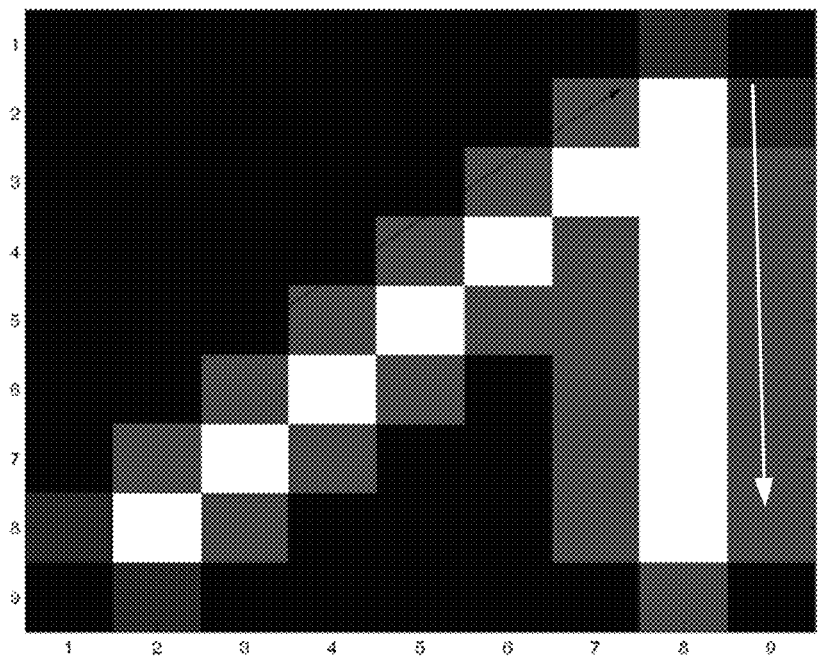
FIGS. 17a-17b illustrate another 2D PSF example in accordance with certain embodiments.
Figure 17B:
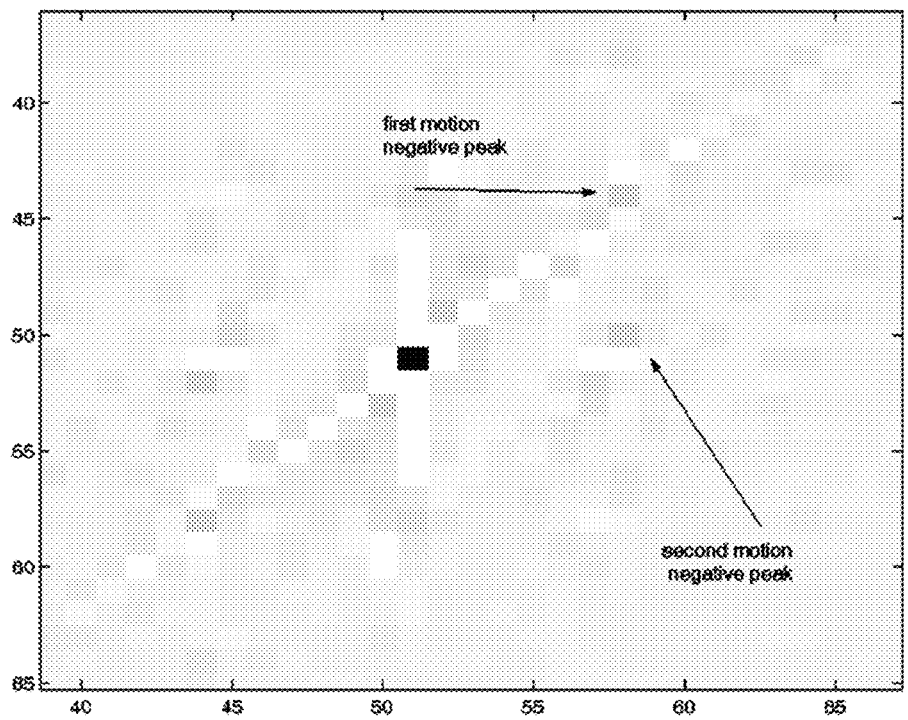

In another example, a motion PSF is made from several lines. FIGS. 17a-17b are illustrative of a 2D PSF example. FIG. 17a illustrates the 2D PSF. The motion illustrated is first oblique and then vertical. FIG. 17b illustrates a zoom in the center of the Cepstrum of the PSF. There are two negative peaks. The first corresponds to the first, oblique part of the motion, while the second corresponds to the vertical one. The separability of the 2D Fourier transform in this example assures the sinc in the spectral domain of the two motions. The final result is the sum of the two.

A section in the PSF, e.g., column 5 in FIG. 17a, may be followed. Then, the "gate" form function (a gate with 1 width) may be retrieved on that column. This produces the sinc, whose zeros produce the periodical negative spikes, although the spikes are considerably smaller in this example. This development of the method provides considerable information concerning the PSF.

A negative peak may appear above the center (as if a first movement involved a vertical movement). The PSF direction may be followed per the second peak (that corresponds to the oblique movement). The order may be given by the larger movement.

Figure 18A:
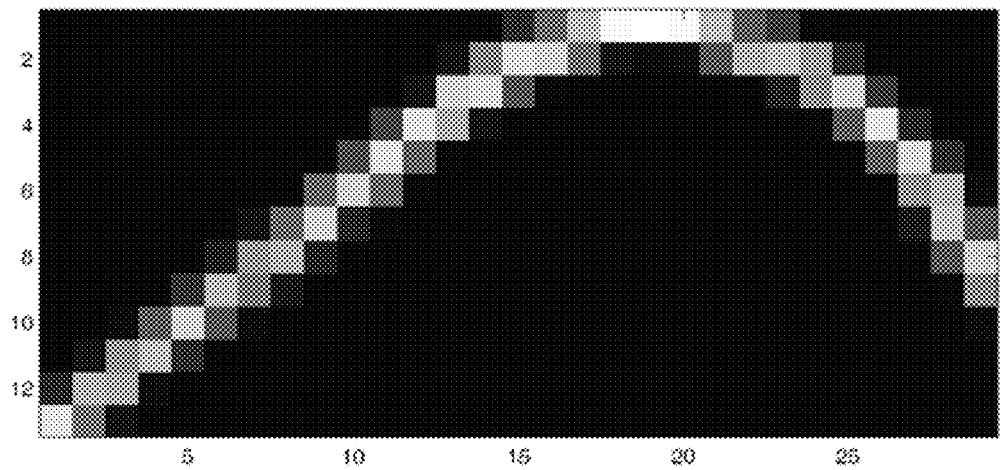
FIGS. 18a-18b illustrate examples of curvilinear motion and corresponding curved PSF in accordance with certain embodiments.
Figure 18B:
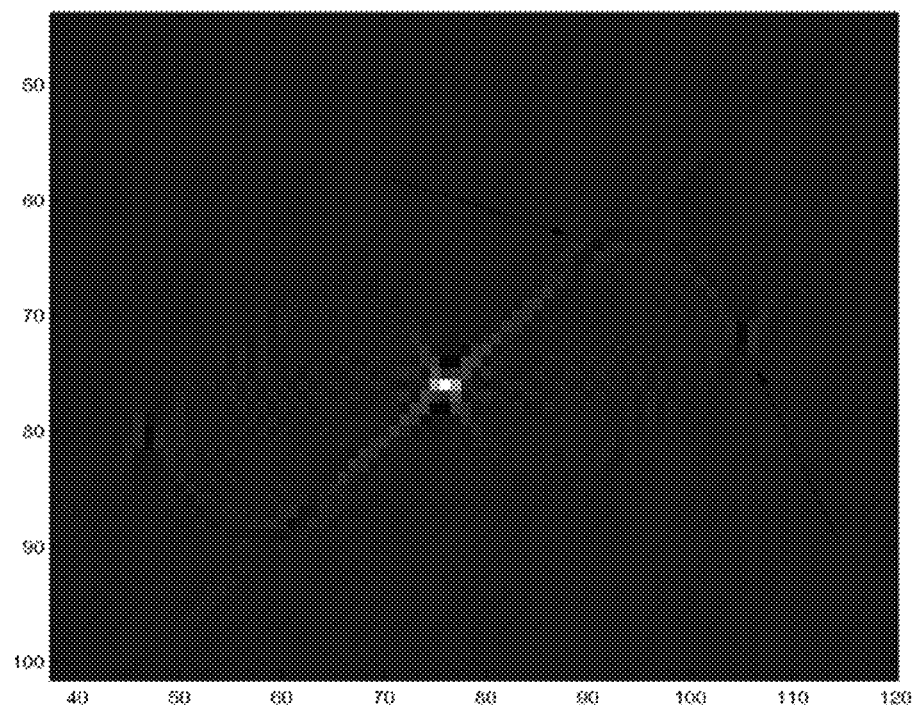

Finally, a curved PSF as in the example of FIGS. 18a-18b which illustrate curvilinear motion and a corresponding curved PSF. FIG. 18a illustrates the curved PSF which has a size of 13×29. FIG. 18b illustrates a zoom in the center of the Cepstrum of the image. The two arrows indicate the negative area. A same or similar construction may be applied as in the previous examples. There are some differences: the "gate" function may not really involve a gate (e.g., it may just be approximated), and one may retrieve several such functions (due to the curvature). All these approximations can end up not in single peak, but in a region of peaks. In the case of a curvilinear motion, a process in accordance with certain embodiments finds the largest negative values, e.g., from one of the areas indicated by arrows in FIG. 18b. The result may be a linear approximation of the PSF (or a part of it).

The negative spikes in the Cepstrum correspond to PSF turning/ending points. Negative areas correspond to a set of PSF curvature points, or areas where the PSF follows a more gradual curved trajectory. Most of the PSF points correspond to positive values in Cepstrum.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

In addition, in methods that may be performed according to preferred and alternative embodiments and claims herein, the operations have been described in selected typographical sequences. However, the sequences have been selected and so ordered for typographical convenience and are not intended to imply any particular order for performing the operations, unless a particular ordering is expressly indicated as being required or is understood by those skilled in the art as being necessary.

Many references have been cited above herein, and in addition to that which is described as background, the invention summary, brief description of the drawings, the drawings and the abstract, these references are hereby incorporated by reference into the detailed description of the preferred embodiments, as disclosing alternative embodiments of elements or features of the embodiments not otherwise expressly set forth in detail above. In addition, the following are incorporated by reference as disclosing alternative embodiments:

FERGUS et al., Removing camera shake from a single image, *SIGGRAPH* 2006, and

US published patent applications US/2010/0008577, US2008/0037827, US/2007/0189748, US/2008/0266419, US/2008/0219517, US/2008/0317379, US/2009/0080796, US/2008/0317378, US/2009/0303343, US/2008/0309769, US/2008/-309770, US/2009/0185753, US/2009/0167893, US/2009/0179999, US/2008/0219581, US/2009/0080797, US/2007/0296833, US/2008/0292193, US/2007/0269108, US/2007/0189748, US/2007/0171987, US2007/0296833, US/2007/0147820, US/2009/0273685, US/2006/0098237, US/2006/0187308, US/2008/0025627, US/2006/0279639, US 2007/0009169, US/2008/0231713, US/2006/0093213, US/2006/0093212 and US/2006/0285754; and M. CANNON IN "Blind Deconvolution of Spatially Invariant Image Blurs with Phase" published in *IEEE Transactions on Acoustics, Speech, and Signal Processing, Vol. SSP-24, NO.* 1, February 1976;

R. L. LAGENDIJK, J. BIEMOND, "Iterative Identification and Restoration of Images", *Kluwer Academic Publishers,* 1991;

Y. YITZHAKY1 AND N. S. KOPEIKA, "Identification of Blur Parameters from Motion Blurred Images", *Graphical Model and Image Processing Vol.* 59, No. 5, September, pp. 310-320, 1997;

J. N. CARON, N. M. NAMAZI, R. L. LUCKE, C. J. ROLLINS, P. R. LYNN, Jr., "Blind data restoration with an extracted filter function", *Optical Letters Vol. 26, No.* 15/Aug. 1, 2001, pp 1164-1166;

D. KUNDUR AND D. HATZINAKOS, Blind image deconvolution, *IEEE Signal Processing Magazine,* 13(3):43-64, May 1996;

JAMES MISKIN AND DAVID J. C. MACKAY, Ensemble Learning for Blind Image Separation and Deconvolution. In M. Girolani, editor, Adv. in *Independent Component Analysis, Springer-Verlag,* 2000;

R. FERGUS, B. SINGH, A. HERTZMANN, S T. ROWEIS, W T. FREEMAN, "Removing Camera Shake from a Single Photograph", *ACM Trans. on Graphics, Vol. 25, Issue* 3, pp. 787-794, (Proc. SIGGRAPH 2006);

B. FURHT, J. GREENBERG, AND R. WESTWATER, "Motion estimation algorithms for video compression", *Kluwer Academic Publishers,* 1997;

MAHMOOD R. AZIMI-SADJADI, AND HONGYE PAN, "Two-Dimensional Block Diagonal LMS Adaptive Filtering", *IEEE TRANSACTIONS ON SIGNAL PROCESSING, Vol.* 42, No. 9, September 1994;

GEORGE-OTHON GLENTIS, "An efficient affine projection algorithm for 2-D FIR adaptive filtering and linear prediction", *Signal Processing* 86(1): 98-116 (2006);

Y. NIE AND K. K. MA, "Adaptive rood pattern search for fast block-matching motion estimation", *IEEE Trans.Image Processing,* 11(12), December 2002;

G. H. GOLUB AND C. F. VAN LOAN, "Matrix Computations", *John Hopkins University Press,* Baltimore, Md., 3rd edition, 1996;

LI, D, MERSEREAU, R. M, SIMSKE, S, "Blur identification based on kurtosis minimization", *ICIP* 2005 (I: 905-908); and LU YUAN, JIAN SUN, LONG QUAN AND HEUNG-YEUNG SHUM, "Image Deblurring with Blurred/Noisy Image Pairs", *SIGGRAPH* 2007.

What is claimed is:

1. A method of adaptive motion estimation and deblurring of acquired digital images, comprising:
    acquiring multiple digital images with a moving digital image acquisition device that includes an image sensor, including a relatively sharp, underexposed reference image and a blurred image;
    estimating an initial approximate point spread function (PSF) based on a first DC offset point corresponding to the moving of the device during the acquiring of the multiple digital images;
    choosing multiple crops from the blurred image and the reference image or an interpolated version of the reference image, or both, and equalizing a brightness between these crops;
    computing a second PSF for a pair of horizontal and vertical offsets;
    calculating a Cepstrum and refining the second PSF to generate a third PSF based on the Cepstrum;
    precisely determining a position of a first PSF point; and
    deblurring at least one of the digital images using a best found PSF based on the third PSF and first PSF point.

2. The method of claim 1, wherein the estimating comprises using a pair of gyro sensors or accelerometers, or a combination thereof.

3. The method of claim 1, wherein the offset comprises a measure of a yaw or a pitch of the image sensor, or both.

4. The method of claim 1, wherein calculating said Cepstrum comprises measuring a linearity of the PSF.

5. The method of claim 1, wherein calculating said Cepstrum comprises computing a Radon transform.

6. The method of claim 1, further comprising changing a PSF fit that does not pass a distance test from the initial approximate PSF.

7. One or more non-transitory computer readable media having code embedded therein for programming one or more processors to perform a method of adaptive motion estimation and deblurring of acquired digital images, wherein the method comprises:
    acquiring multiple digital images with a moving digital image acquisition device that includes an image sensor, including a relatively sharp, underexposed reference image and a blurred image;
    estimating an initial approximate point spread function (PSF) based on a first DC offset point corresponding to the moving of the device during the acquiring of the multiple digital images;
    choosing multiple crops from the blurred image and the reference image or an interpolated version of the reference image, or both, and equalizing a brightness between these crops;
    computing a second PSF for a pair of horizontal and vertical offsets;
    calculating a Cepstrum and refining the second PSF to generate a third PSF based on the Cepstrum;
    precisely determining a position of a first PSF point; and
    deblurring at least one of the digital images using a best found PSF based on the third PSF and first PSF point.

8. The one or more computer readable media of claim 7, wherein the estimating comprises using a pair of gyro sensors or accelerometers, or a combination thereof.

9. The one or more computer readable media of claim 7, wherein the offset comprises a measure of a yaw or a pitch of the image sensor, or both.

10. The one or more computer readable media of claim 7, wherein calculating said Cepstrum comprises measuring a linearity of the PSF.

11. The one or more computer readable media of claim 7, wherein calculating said Cepstrum comprises computing a Radon transform.

12. The one or more computer readable media of claim 7, further comprising changing a PSF fit that does not pass a distance test from the initial approximate PSF.

13. A digital image acquisition device, comprising:
a lens and an image sensor for acquiring a digital image;
a processor; and
one or more processor-readable media having code embedded therein for programming the processor to perform a method of adaptive motion estimation and deblurring of acquired digital images, wherein the method comprises:
acquiring multiple digital images with a moving digital image acquisition device that includes an image sensor, including a relatively sharp, underexposed reference image and a blurred image;
estimating an initial approximate point spread function (PSF) based on a first DC offset point corresponding to the moving of the device during the acquiring of the multiple digital images;
choosing multiple crops from the blurred image and the reference image or an interpolated version of the reference image, or both, and equalizing a brightness between these crops;
computing a second PSF for a pair of horizontal and vertical offsets;
calculating a Cepstrum and refining the second PSF to generate a third PSF based on the Cepstrum;
precisely determining a position of a first PSF point; and
deblurring at least one of the digital images using a best found PSF based on the third PSF and first PSF point.

14. The device of claim 13, wherein the estimating comprises using a pair of gyro sensors or accelerometers, or a combination thereof.

15. The device of claim 13, wherein the offset comprises a measure of a yaw or a pitch of the image sensor, or both.

16. The device of claim 13, wherein calculating said Cepstrum comprises measuring a linearity of the PSF.

17. The device of claim 13, wherein calculating said Cepstrum comprises computing a Radon transform.

18. The device of claim 13, further comprising changing a PSF fit that does not pass a distance test from the initial approximate PSF.

* * * * *